(12) United States Patent
Holzapfel et al.

(10) Patent No.: US 9,234,593 B2
(45) Date of Patent: Jan. 12, 2016

(54) MECHANICAL SEAL UNIT, PARTICULARLY FOR A FIRE EXTINGUISHING PUMP

(75) Inventors: Thomas Holzapfel, Sindelsdorf (DE); Wolfgang Ries, Eschenlohe (DE); Reinhard Svejkovsky, Geretsried (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 787 days.

(21) Appl. No.: 13/519,680

(22) PCT Filed: Dec. 9, 2010

(86) PCT No.: PCT/EP2010/007509
§ 371 (c)(1),
(2), (4) Date: Sep. 20, 2012

(87) PCT Pub. No.: WO2011/085762
PCT Pub. Date: Jul. 21, 2011

(65) Prior Publication Data
US 2013/0011256 A1    Jan. 10, 2013

(30) Foreign Application Priority Data
Jan. 14, 2010 (DE) .................... 20 2010 000 954 U

(51) Int. Cl.
*F04D 29/12* (2006.01)
*F16J 15/34* (2006.01)

(52) U.S. Cl.
CPC ............. *F16J 15/348* (2013.01); *F04D 29/122* (2013.01)

(58) Field of Classification Search
CPC ....... F16J 15/34; F16J 15/3464; F16J 15/348; F16J 15/3452; F16J 15/346; F16J 15/3412; F04D 29/10; F04D 29/122; F04D 29/12
USPC ................. 277/357, 358, 367, 369, 377, 380; 416/244 R; 415/230, 231
See application file for complete search history.

(56) References Cited

U.S. PATENT DOCUMENTS

| 2,769,390 | A | * | 11/1956 | Heimbuch | .............. 415/111 |
| 3,244,425 | A | * | 4/1966 | Wilkinson | .............. 277/390 |
| 4,840,384 | A | * | 6/1989 | Dorsch | .............. 277/379 |
| 5,556,110 | A | * | 9/1996 | Marsi et al. | .............. 277/397 |
| 2005/0035554 | A1 | * | 2/2005 | Roberts et al. | .............. 277/358 |

FOREIGN PATENT DOCUMENTS

GB    2399603 A  *  9/2004  .............. F16J 15/34

* cited by examiner

*Primary Examiner* — Igor Kershteyn
*Assistant Examiner* — Woody A Lee, Jr.
(74) *Attorney, Agent, or Firm* — Locke Lord LLP; Scott D. Wofsy

(57) ABSTRACT

The present invention refers to a premounted mechanical seal unit, particularly for a fire extinguishing pump, with a rotating seal ring a stationary seal ring, the rotating seal ring and the stationary seal ring defining a seal gap thereinbetween, an inner sleeve which is connected to the rotating seal ring, an outer sleeve which is connected to the stationary seal ring, and a securing element which secures the outer sleeve to the inner sleeve. The inner sleeve and the outer sleeve in axial direction each have a length greater than a sum of the axial lengths of the rotating seal ring. The inner sleeve has a first form closure device on a first axial end and a second form closure device on a second axial end.

13 Claims, 3 Drawing Sheets

MECHANICAL SEAL UNIT, PARTICULARLY FOR A FIRE EXTINGUISHING PUMP

The present invention relates to a mechanical seal unit which can be used as a premounted assembly, particularly in fire extinguishing pumps.

The prior art discloses different mechanical seal assemblies which can e.g. also be used in pumps. A special field of application of such pumps is e.g. provided by mobile fire extinguishing pumps, which are specifically used for forest fire fighting. Such fire extinguishing pumps are partly used under extreme conditions of use and must thus have a robust structure. Water for fire fighting is here often taken from a river or pond or the like so that the extinguishing water often contains impurities or small solids. Therefore, a mechanical seal which exists in such a fire extinguishing pump must also allow for a robust operation. Due to the aggravated conditions of use it may happen that a mechanical seal is perhaps also damaged and should thus be exchanged in a fast and easy way.

It is therefore the object of the present invention to provide a premounted mechanical seal unit which, while being easily producible at low costs, has a structure that is as robust as possible and permits a rapid exchange, if necessary.

This object is achieved by a mechanical seal unit comprising the features of claim 1. The sub-claims refer to preferred developments of the invention.

The premounted mechanical seal unit according to the invention has the advantage that it is ready for assembly as a compact unit and can be installed in a fast and simple way, e.g. in a fire extinguishing pump. The mechanical seal unit comprises a rotating seal ring and a stationary seal ring that form a seal gap therebetween, an inner sleeve connected to the rotating seal ring, and an outer sleeve connected to the stationary seal ring. A securing element is also provided for securing the outer sleeve to the inner sleeve, so that the mechanical seal unit cannot fall apart again in the premounted state. Viewed in axial direction, the inner sleeve and the outer sleeve have each a length which is longer than a sum of the axial lengths of the stationary and rotating seal rings. Hence, the seal rings are completely covered by the inner sleeve and the outer sleeve over their axial length in radial direction. Furthermore, for an easy and fast assembly, the inner sleeve has formed thereon a first form closure device and a second form closure device that are each arranged on one of the axial ends of the inner sleeve. To simplify mounting and to avoid mounting errors, the two form closure devices preferably have different configurations on the inner sleeve. Further preferably, the two form closure devices are arranged on the axial ends of the inner sleeve on a respective, radially inner position.

In a preferred configuration of the invention, the first form closure device comprises recesses which are preferably arranged evenly distributed on the first axial end of the inner sleeve. Further preferably, the second form closure device comprises protruding elements which are arranged circumferentially evenly distributed on the second axial end of the inner sleeve.

Further preferably, a spring element is provided which is arranged on the stationary seal ring to bias the stationary seal ring against the rotating seal ring, the spring element being preferably supported on the outer sleeve. The spring element can thereby easily be integrated into the mechanical seal unit.

According to a further preferred configuration of the invention, the mechanical seal unit comprises retaining pins which are arranged on the outer sleeve, the stationary seal ring including recesses engaged by the retaining pins. The stationary seal ring is thereby stationarily held to prevent co-rotation with the rotating seal ring.

Preferably, the inner sleeve comprises a radially outwardly directed flange, and the outer sleeve comprises a radially inwardly directed flange. The seal rings can thereby be arranged between the two flanges of the inner sleeve with the outer sleeve, resulting in a particularly compact unit. Furthermore, this results in a very small part number.

Preferably, the inner sleeve comprises a surrounding recess on the outwardly directed radial flange for accommodating the rotating seal ring. The flange is preferably provided in a overlapping manner such that it grips at least partly over an outer circumference of the rotating seal ring.

To protect the seal rings as well as the inner sleeve, an axial length of the outer sleeve is preferably greater than an axial length of the inner sleeve.

Further preferably, for an operation which is as reliable as possible, the mechanical seal unit is configured as a mechanical seal unit which is acted upon on the outside, with a back side of the stationary seal ring being also in contact with the medium to be sealed.

Furthermore, the present invention relates to a pump, particularly a fire extinguishing pump, which comprises a mechanical seal unit according to the invention, wherein a first axial end of an inner sleeve of the mechanical seal unit and a pump wheel have formed therebetween a first form closure device, and a second form closure device is provided between a second axial end of the inner sleeve and a drive shaft. The premounted mechanical seal unit can thereby be mounted in an easy and secure manner. Preferably, a bearing for the drive shaft is here arranged directly next to the mechanical seal unit. The mechanical seal unit can thereby also provide a reliable sealing for the bearing. The second form closure device is preferably provided on a shaft shoulder of the drive shaft.

A preferred embodiment will now be described in detail with reference to the accompanying drawing, in which.

A mechanical seal unit 1 according to a preferred configuration of the invention will now be described in detail with reference to FIGS. 1 to 4.

Figure 1:
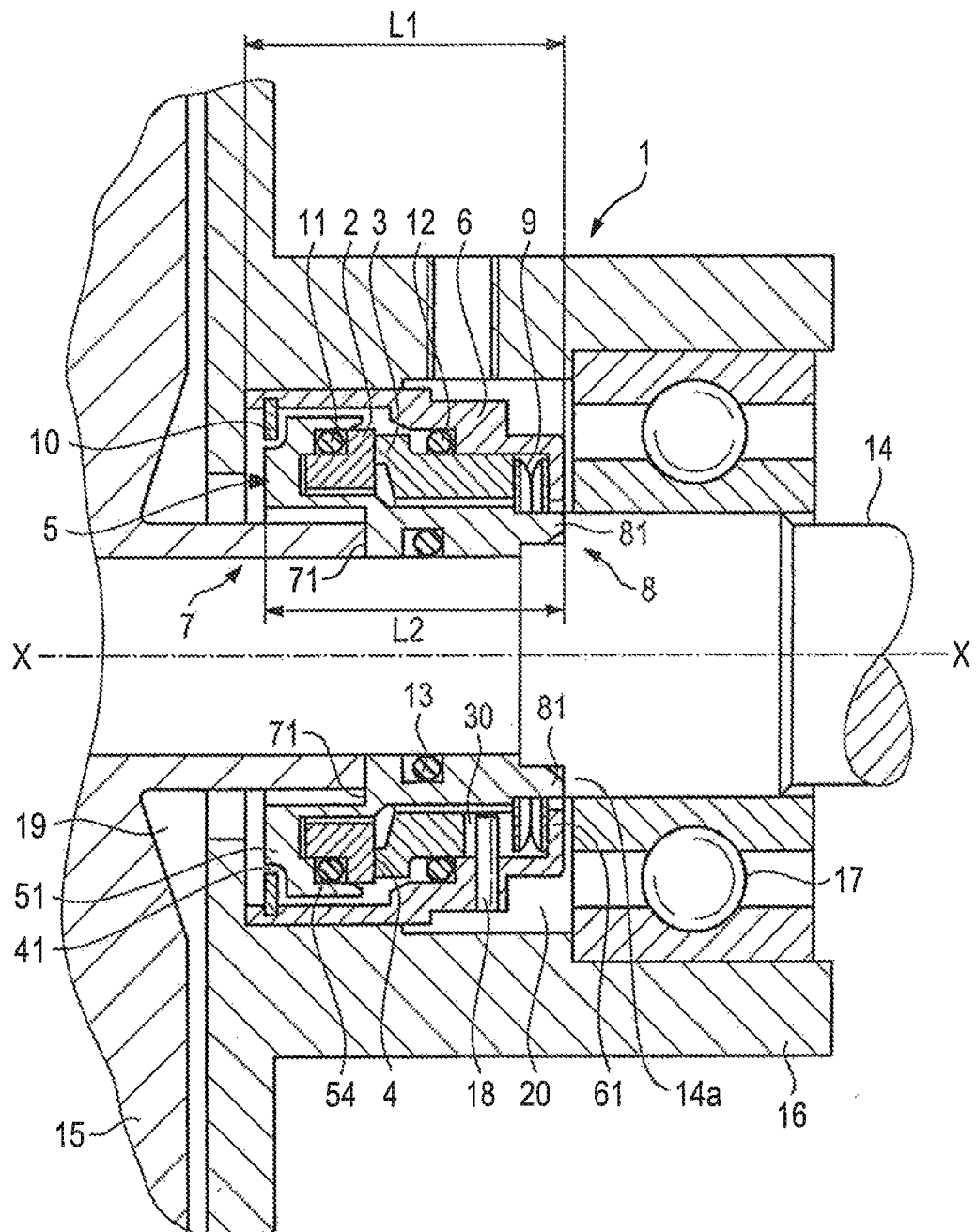
FIG. 1 is a schematic sectional view of a pump comprising a mechanical seal unit according to one embodiment of the invention.

FIG. 1 is a schematic sectional view showing a pump with a drive shaft 14 and a pump wheel 15 in which a premounted mechanical seal unit 1 according to the invention is installed. The premounted mechanical seal unit 1 can here be mounted as a complete assembly in a fast and simple way into the pump.

As can be seen in FIG. 1, the mechanical seal unit 1 comprises a rotating seal ring 2 and a stationary seal ring 3 which define a seal gap 4 on the sliding surfaces oriented to one another. The premounted mechanical seal unit 1 further comprises an integral inner sleeve 5 which rotates together with the drive shaft 14, and an integral outer sleeve 6 which is fixed to a housing 16. Furthermore, the mechanical seal unit 1 comprises a spring element 9 which biases the stationary seal ring 3 against the rotating seal ring 2. The spring element 9 is here supported with one end on a radially inwardly directed flange 61 of the outer sleeve 6. The inner sleeve comprises an outwardly directed flange 51, the two seal rings 2, 3 as well as the spring element being arranged in axial direction X-X between the flanges 51, 61 (cf. FIG. 1). In axial direction, the inner sleeve 5 and the outer sleeve 6 have each a length which is longer than a sum of the axial lengths of the stationary and rotating seal rings 2, 3. Hence, the seal rings 2, 3 are fully covered by the inner sleeve 5 and the outer sleeve 6 over their axial length in radial direction. As a result, the seal rings 2, 3 of the premounted unit are very well protected.

Figure 3:
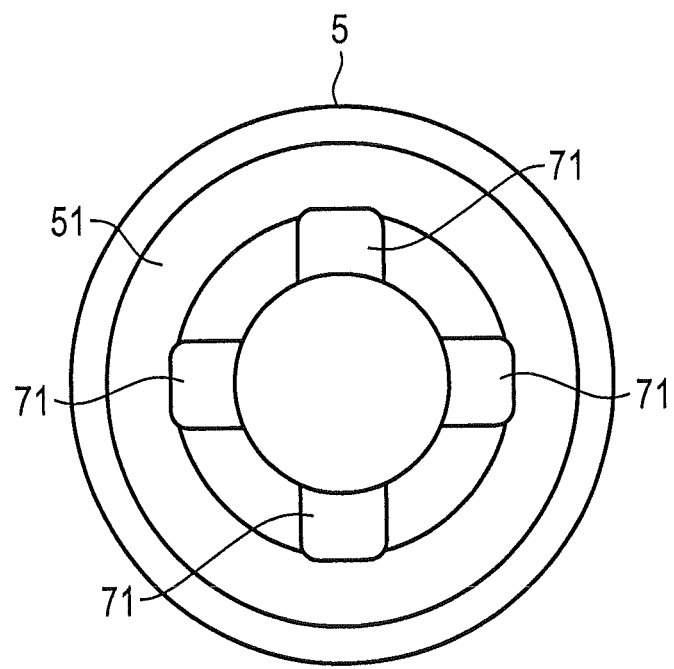
FIG. 3 is a top view on the inner sleeve of FIG. 2 with a first form closure device.
Figure 4:
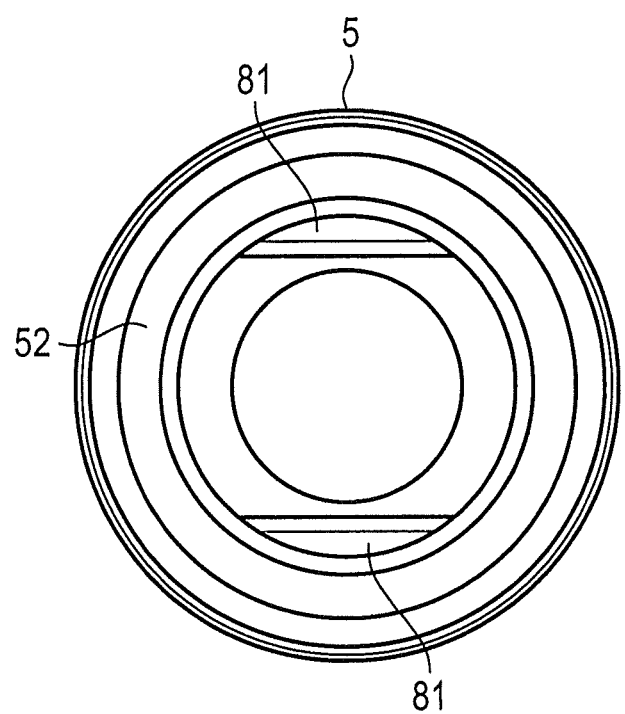
FIG. 4 is a top view on a second axial end of the inner sleeve with a second form closure device.

Furthermore, the premounted mechanical seal unit 2 on the inner sleeve 5 comprises a first form closure device 7 which is arranged on a first axial end of the inner sleeve 5, and a second form closure device 8 which is arranged on a second axial end of the inner sleeve 5. The two form closure devices 7, 8 establish a form-fit or positive connection to the pump impeller 15 and to the drive shaft 14, respectively. The pump impeller 15 has a form matching the first form closure device 7, and on the drive shaft 14 a corresponding form for the second form closure device 8 is provided on a shaft shoulder 14a. As shown in FIG. 3, the first form closure device 7 comprises four recesses 71 that are formed evenly distributed along the circumference on a radially inner side of the inner sleeve 5. The second form closure device 8 comprises two protruding elements 81 which, as can be seen in FIG. 4, are arranged opposite to each other by 180°. The protruding elements 81 engage here into corresponding recesses formed on the shaft shoulder 14a of the drive shaft 14.

Figure 2:
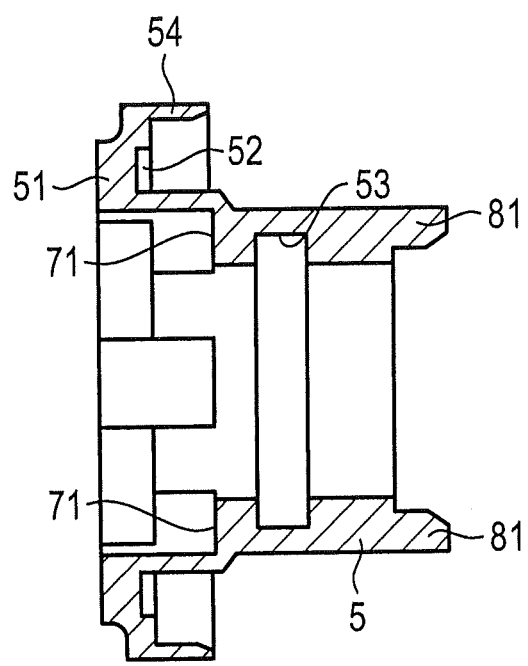
FIG. 2 is a sectional view of an inner sleeve of the mechanical seal unit of FIG. 1.

Furthermore, the premounted mechanical seal unit 1 comprises a securing ring 10 which secures the outer sleeve 6 on the inner sleeve 5 to obtain a unit ready for installation. The securing ring is arranged in radial direction between the inner sleeve 5 and the outer sleeve 6. Alternatively, instead of the securing ring 10, the free end of the outer sleeve which is directed to the impeller 15 can also be deformed radially inwards. The mechanical seal unit 1, however, can then no longer be disassembled without destruction, as is possible when the securing ring 10 is used. Furthermore, the mechanical seal unit 1 comprises three O-rings, a first O-ring 11 sealing on an outer circumference of the rotating seal ring 2, a second O-ring 12 sealing on an outer circumference of the stationary seal ring 3, and a third O-ring 13 sealing on an inner circumference of the inner sleeve 5. As can be seen in FIG. 2, a surrounding groove 53 which accommodates the third O-ring 13 is formed on the inner circumference of the inner sleeve 5. Furthermore, the inner sleeve 5 comprises the radially outwardly directed flange 51 in which an annular recess 52 is formed. The annular recess 52 serves to accommodate the rotating seal ring 2 and the first O-ring 11 (cf. FIG. 1). A portion 54 overlaps the rotating seal ring 2 almost completely. An undesired rotation of the stationary seal ring 3 is here prevented by at least one retaining pin 18 which engages into a recess 30 in the stationary seal ring 3. The retaining pin 18 is fixed in the outer sleeve 6. An axial length L1 of the outer sleeve is longer in axial direction X-X than an axial length L2 of the inner sleeve 5.

The mechanical seal unit 1 can here be premounted such that first of all the first O-ring 11 and the rotating seal ring 2 are arranged in the recess 52 of the inner sleeve 5, subsequently the stationary seal ring 3 as well as the second O-ring 12 and the spring element 9 are pushed onto the inner sleeve 5, the outer sleeve 6 is then pushed over the components arranged in this way from the second axial end of the inner sleeve 5 and is secured by means of the securing ring 10. In the uninstalled state, the spring element 9 presses the outer sleeve 6 in axial direction away from the stationary seal ring 3, so that the securing ring 10 abuts on the inner sleeve 5, more exactly on the radially outwardly directed flange 51. It is thereby prevented that the individual components of the premounted mechanical seal unit 1 are able to move relative to one another and that the mechanical seal unit can fall apart. In the mounted state shown in FIG. 1, the spring element 5 is then held in a biased state by the outer sleeve 6, and a biasing force is exerted on the stationary seal ring 3. As can be seen in FIG. 1, the securing ring 10 is thereby slightly spaced apart in axial direction from the inner sleeve. In this case, however, only a relatively small gap 41 exists between the securing ring 10 and the inner sleeve 5, so that large solid particles are thereby prevented from penetrating up to the seal gap 4.

Due to the provision of the positive connections at the two axial ends of the inner sleeve 5, it is possible to mount the premounted mechanical seal unit 1 in a safe way. Since the two form closure devices 7, 8 have different configurations, an incorrect mounting is avoided. No special mounting tool is needed for the assembly, but the mechanical seal unit 1 can seal a pump chamber 19 relative to a bearing chamber 20 in which the bearing 17 is arranged. The mechanical seal unit 1 is arranged in axial direction X-X directly next to the bearing 17.

The mechanical seal unit 1 can be fixed in the pump by means of a press fit between the outer circumference of the outer sleeve 6 and the housing 16. The inner sleeve 5 can optionally also be pressed onto the drive shaft 14.

The invention claimed is:

1. A pump, comprising:
a premounted mechanical seal unit, a pump impeller, and a drive shaft, the mechanical seal unit including:
a rotating seal ring;
a stationary seal ring, the rotating seal ring and the stationary seal ring defining a seal gap therebetween;
an inner sleeve which is connected to the rotating seal ring;
an outer sleeve which is connected to the stationary seal ring; and
a securing element which secures the outer sleeve to the inner sleeve,
wherein the inner sleeve and the outer sleeve in axial direction each have a length greater than a sum of the axial lengths of the stationary and rotating seal rings; and
wherein the inner sleeve comprises a first form closure device on a first axial end and a second form closure device on a second axial end,
wherein the first form closure device is disposed between the inner sleeve of the mechanical seal unit and the pump impeller,
wherein the second form closure device is disposed between the inner sleeve of the mechanical seal unit and the drive shaft.

2. The pump according to claim 1, wherein the first and second form closure device have different forms.

3. The pump according to claim 1, wherein the first form closure device comprises recesses which are arranged in a circumferential direction about a rotation axis of the pump impeller and are evenly distributed on the first axial end of the inner sleeve.

4. The pump according to claim 1, wherein the second form closure device comprises protruding elements which are arranged in circumferential direction evenly distributed on the second axial end of the inner sleeve.

5. The pump according to claim 4, wherein the protruding elements of the second form closure device engage corresponding recesses of the drive shaft.

6. The pump according to claim 1, further comprising a spring element which is arranged on the stationary seal ring to bias the stationary seal ring against the rotating seal ring.

7. The pump according to claim 1, wherein the inner sleeve comprises a radially outwardly directed flange and the outer sleeve comprises a radially inwardly directed flange.

8. The pump according to claim 7, wherein the spring element is supported on the radially inwardly directed flange of the outer sleeve.

9. The pump according to claim 7, wherein a surrounding recess for accommodating the rotating seal ring is provided in the radially outwardly directed flange.

10. The pump according to claim 1, wherein an axial length of the outer sleeve is greater than an axial length of the inner sleeve.

11. The pump according to claim 1, wherein the first form closure device has a form-fit or positive connection with the pump impeller.

12. The pump according to claim 1, wherein the second form closure device has a form fit or positive connection with the drive shaft.

13. The pump according to claim 1, wherein the first form closure device is defined on a first axial end face of the inner sleeve, wherein the second form closure device is defined on a second axial end face of the inner sleeve that is axially opposite the second form closure device.

\* \* \* \* \*